(12) United States Patent
Tonar et al.

(10) Patent No.: US 6,248,263 B1
(45) Date of Patent: *Jun. 19, 2001

(54) ELECTROCHROMIC LAYER AND DEVICES COMPRISING SAME

(75) Inventors: William L. Tonar; Harlan J. Byker, both of Holland; Kathy E. Siegrist, Grand Rapids; John S. Anderson, Holland; Kevin L. Ash, Grand Rapids, all of MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/361,923

(22) Filed: Jul. 27, 1999

Related U.S. Application Data

(63) Continuation of application No. 08/616,967, filed on Mar. 15, 1996, now Pat. No. 5,928,572.

(51) Int. Cl.$^7$ ................. G02F 1/00; G02F 1/153
(52) U.S. Cl. ............ 252/583; 359/265; 359/267; 359/273; 359/275
(58) Field of Search ............ 252/583; 359/265, 359/267, 273, 275

(56) References Cited

U.S. PATENT DOCUMENTS

| | | |
|---|---|---|
| 3,357,930 | 12/1967 | Marks et al. |
| 3,708,220 | 1/1973 | Meyers et al. |
| 3,840,287 | 10/1974 | Witzke et al. |
| 4,174,152 | 11/1979 | Giglia et al. |
| 4,519,930 | 5/1985 | Kakiuchi . |
| 4,550,982 | 11/1985 | Hirai . |
| 4,761,061 | 8/1988 | Nishiyama et al. |
| 4,810,067 | 3/1989 | Demiryont . |
| 4,902,108 | 2/1990 | Byker . |
| 5,068,062 | 11/1991 | Inata et al. |
| 5,074,648 | 12/1991 | Warszawski . |
| 5,078,480 | 1/1992 | Warszawski . |
| 5,086,351 | 2/1992 | Couput et al. |
| 5,223,353 | 6/1993 | Ohsawa et al. |
| 5,240,791 | 8/1993 | Izuti et al. |
| 5,274,493 | 12/1993 | Couput et al. |
| 5,275,750 | 1/1994 | Sato et al. |
| 5,276,547 | 1/1994 | Couput et al. |
| 5,300,374 | 4/1994 | Agrawal et al. |
| 5,327,281 | 7/1994 | Cogan et al. |
| 5,332,530 | 7/1994 | Eid et al. |
| 5,378,404 | 1/1995 | Han et al. |
| 5,394,264 | 2/1995 | Marchese et al. |
| 5,679,283 | 10/1997 | Tonar et al. |
| 5,888,431 | 3/1999 | Tonar et al. |
| 5,928,572 * | 7/1999 | Tonar et al. .......... 252/583 |

FOREIGN PATENT DOCUMENTS

| | | |
|---|---|---|
| 612826 * | 8/1994 | (EP) . |
| 0612826 | 8/1994 | (EP) . |
| 1314049 | 4/1973 | (GB) . |
| 9603475 | 2/1996 | (WO) . |

OTHER PUBLICATIONS

Tsutsum, Hiromori et al., "Polymer Gel Films with Simple Organic Electrochromice for Single–Film Electrochromic Devices, *Journal of Polymer Science: Part A: Polymer Chemistry*," vol. 30, 1725–1729 (1992).

Tsutsumi, Hiromori et al., "Single Polymer Gel Film Electrochromic Device," *Electrochimica Acta*, vol. 37, No. 2, pp. 369–370, 1992.

Tatistcheff, Helen B. et al., "Comparison of Diffusion Coefficients of Electroactive Species in Aqueous Fluid Electrolytes and Polyacrylate Gels: Step Generation—Collection Diffusion Measurements and Operation of Electrochemical Devices," *J. Phys. Chem.*, vol. 97, 1993, pp. 2732–2739.

Asahi Glass Co. Ltd., "Optical Modulation Using an Electrochromic Material" (Abstract of a Japanese Patent Application Published May 8, 1984), Chemical Abstrat, vol. 101, No. 140864 (1984).

Nagai et al., "Gelled Electrolyte Electrochromic Material" (Abstract of a Japanese Patent Application Published May 11, 1988), Chemical Abstract, vol. 109, No. 119757 (1988).

Nagai et al., "Gelled Electrolyte Electrochromic Materials" (Abstract of a Japanese Patent Application Published May 11, 1988), Chemical Abstract, vol. 109, No. 119758 (1988).

Kojima et al., "Preparation of Viologen–containing Polymer Gels" (Abstract of a Japanese Patent Application published Sep. 14, 1989), Chemical Abstract, vol. 112, No. 100280 (1990).

* cited by examiner

*Primary Examiner*—Philip Tucker
(74) *Attorney, Agent, or Firm*—Factor & Partners, LLC; Brian J. Rees

(57) ABSTRACT

The present invention provides improved electrochromic layers, which comprise polymeric matrices with electrochromic solutions interspersed therein. Varying an electrical potential difference across a layer of the invention results in reversible variation in the transmittance of light across the layer because of electrochemical processes in the electrochromic solution of the layer. The invention further provides electrochromic devices, in which the electrochromic layers of the invention provide reversibly variable transmittance to light, and various apparatus in which the devices of the invention provide light-filtering or light-color modulation. Such apparatus include windows, including those for use inside and on the outside walls of buildings and in sunroofs for automobiles, and variable reflectance mirrors, especially rearview mirrors for automobiles.

20 Claims, No Drawings

ELECTROCHROMIC LAYER AND DEVICES COMPRISING SAME

CROSS-REFERENCE TO RELATED APPLICATIONS

This application is a continuation of U.S. patent application Ser. No. 08/616,967 entitled "ELECTROCHROMIC LAYER AND DEVICES COMPRISING SAME," filed on Mar. 15, 1996, by William L. Tonar et al., now U.S. Pat. No. 5,928,572. This application thereby claims priority under 35 U.S.C. §120 on U.S. patent application Ser. No. 08/616,967. The entire disclosure of U.S. patent application Ser. No. 08/616,967 is incorporated herein by reference.

TECHNICAL FIELD

The present invention relates to electrochromic devices which provide light-filtering, color-modulation, or reflectance-modulation in apparatus such as variable-transmittance windows, variable-reflectance mirrors; and display devices which employ such light-filters or mirrors in conveying information.

More particularly, the invention concerns the electrochromic medium in such an electrochromic device. The electrochromic medium undergoes a change in transmittance to light, and a concomitant change in color, when an electrical potential difference is imposed across it in the device.

The invention relates to novel electrochromic media which address a number of problems presented by electrochromic devices with electrochromic media which comprise fluids or solutions. The media of the invention occur in electrochromic devices of the invention as electrochromic layers occupying the space between electrode layers of the devices. A medium of the invention comprises a polymeric matrix, which provides a measure of structural integrity and other advantages, and an electrochromic solution, which is interspersed throughout the polymeric matrix and provides variable transmittance to light.

In addition to the novel electrochromic media and electrochromic devices of the invention, the invention relates to novel apparatus which comprise the electrochromic devices of the invention to provide light-filtering or color-modulation.

BACKGROUND OF THE INVENTION

The term electrochromic is broad and encompasses within it various media, such as, for example, solution-phase, surface-confined, electro-deposition, or combinations thereof, which undergo a change in transmittance to light, and a concomitant change in color, when an electrical potential difference is imposed across the electrochromic media in a device.

There has been a great deal of research on surface-confined electrochromic media where the layers changing their transmittance to light are thin films deposited on the transparent electrodes within an electrochromic device. In these devices, an anodic electrochromic layer and a cathodic electrochromic layer are separate and distinct, and are electrically connected by a conductive electrolyte. Either thin film may be stoichiometric and nonstoichiometric forms of transition metal oxides, such as for example tungsten oxide, molybdenum oxide, nickel oxide, rhodium oxide, iridium oxide, niobium oxide, vanadium oxide, titanium dioxide, and combinations thereof. These electrochromic solid films are typically paired with an auxiliary redox system, which may be another metal oxide, or may be a solution phase, a surface-confined polymer film, or an electro-deposited polymer film species (all of which are described in detail hereinbelow).

These surface-confined thin films may also be a polymeric layer such as polyanaline, polypyrroles, polythiophenes, and the like. U.S. Pat. No. 5,282,955, entitled "Electrically Conductive Polymer Composition, Method of Making Same and Device Incorporating Same" to N. Leventis et al. teaches an electrically conductive polymer with a porous structure having an electrochromic compound coated on the surfaces of the pores of the structure.

The electrochromic media may comprise an electro-deposition-type materials such as, for example, metal, metal oxides and heptyl viologen bromide in water.

Finally, the electrochromic media may include a solution-phase system. Solution-phase electrochromic devices and various circuitry and applications thereof are described in U.S. Pat. No. 4,902,108, entitled "Single-Compartment, Self-Erasing, Solution-Phase Electro-optic Devices Solutions for Use Therein, and Uses Thereof", issued Feb. 20, 1990 to H. J. Byker; Canadian Patent No. 1,300,945, entitled "Automatic Rearview Mirror System for Automotive Vehicles", issued May 5, 1992 to J. H. Bechtel et al.; U.S. Pat. No. 5,128,799, entitled "Variable Reflectance Motor Vehicle Mirror", issued Jul. 7, 1992 to H. J. Byker; U.S. Pat. No. 5,202,787, entitled "Electro-Optic Device", issued Apr. 13, 1993 to H. J. Byker et al.; U.S. Pat. No. 5,204,778, entitled "Control System For Automatic Rearview Mirrors", issued Apr. 20, 1993 to J. H. Bechtel; U.S. Pat. No. 5,278,693, entitled "Tinted Solution-Phase Electrochromic Mirrors", issued Jan. 11, 1994 to D. A. Theiste et al.; U.S. Pat. No. 5,280,380, entitled "UV-Stabilized Compositions and Methods", issued Jan. 18, 1994 to H. J. Byker; U.S. Pat. No. 5,282,077, entitled "Variable Reflectance Mirror", issued Jan. 25, 1994 to H. J. Byker; U.S. Pat. No. 5,282,077, entitled "Variable Reflectance Mirror", issued Jan. 25, 1994 to H. J. Byker; U.S. Pat. No. 5,294,376, entitled "Bipyridinium Salt Solutions", issued Mar. 15, 1994 to H. J. Byker; U.S. Pat. No. 5,336,448, entitled "Electrochromic Devices with Bipyridinium Salt Solutions", issued Aug. 9, 1994 to H. J. Byker; U.S. Pat. No. 5,434,407, entitled "Automatic Rearview Mirror Incorporating Light Pipe", issued Jan. 18, 1995 to F. T. Bauer et al.; U.S. Pat. No. 5,448,397, entitled "Outside Automatic Rearview Mirror for Automotive Vehicles", issued Sep. 5, 1995 to W. L. Tonar; and U.S. Pat. No. 5,451,822, entitled "Electronic Control System", issued Sep. 19, 1995 to J. H. Bechtel et al. Each of these patents is commonly assigned with the present invention and the disclosures of each, including the references contained therein, are hereby incorporated herein in their entirety by reference. Additionally, the following references by others are also incorporated herein in their entirety by reference: U.S. Pat. Nos. 3,806,229 and 3,451,741; European Patent Application Publication Nos. 0 012 419, 0 430 684, 0 430 686, 0 435 689 and 0 552 012; and Non-emissive Electrooptic Displays, Kmetz and von Willisen, eds., Plenum Press, New York, N.Y., USA (1976), and especially the chapter therein by Chang, "Electrochromic and Electrochemichromic Materials and Phenomena," at pp. 155–196.

In typical solution-phase electrochromic devices, and particularly devices which are single-compartment and self-erasing, a solution is held as a thin layer in a compartment which is formed by two walls, at least one of which is transparent to light (electromagnetic radiation of wavelength in the visible range), and spacers or sealant which separate the two walls and form the periphery of the compartment. The inner sides, those which face each other, of the two walls are each coated with an electrode layer which is in contact with the solution. An electrode layer functions as an electrode in contact with the solution and is a layer of a material which is electronically conducting. The electrode layer on at least one of the walls is transparent to light, because, as indicated above, at least one of the walls is transparent to light. Transparent electrode layers may be made of tin oxide, tin-doped indium oxide, indium tin oxide, fluorine-doped tin oxide, fluorine-doped zinc oxide, gold, cadmium stannate, ruthenium oxide, or the like, as known in the art. One of the walls and, consequently, one of the electrode layers may be non-transparent. For example, a non-transparent electrode layer might be a reflecting layer, a layer which reflects light, and may be made of a metal, semiconductor material, or the like which may or may not be specularly reflecting.

The layer of solution or other type of medium between the walls of an electrochromic device is sometimes referred to as an "electrochromic layer."

When a sufficient potential difference is applied between the electrode layers across the solution of such a device, the transmittance of the solution changes at least one wavelength in the visible range and, as a consequence, the solution changes color, becoming darker or clearer. Typically, the solution in such a device will be clear or slightly colored (tinted) in its zero-potential, equilibrium state and will be darkened through electrochemical reaction (s) when a potential difference is applied. If the device is a solution-phase electrochromic device, the electrochromic compounds (those which have a change in transmittance in the visible wavelength range upon electrochemical oxidation (anodic electrochromic compound) or reduction (cathodic electrochromic compound) are in solution and remain in solution without precipitation upon oxidation or reduction in operation of the device.

In a single-compartment device, at least one anodic electrochromic compound and at least one cathodic electrochromic compound are together in the same compartment and are able to diffuse throughout the entire compartment (e.g., layer between the electrode layers).

In the case of a single-compartment device, self-erasing occurs, when there is no potential difference between the electrode layers, as oxidized anodic compound and reduced cathodic compound react with one another by electron transfer and both return to their zero-potential equilibrium states. However, an electrochromic device need not have both the anodic and cathodic electrochromic compounds in the solution. One compound in solution may be paired with a surface-confined material or an electro-deposited material.

Solutions of variable transmittance in solution-phase electrochromic devices may comprise components in addition to solvent and electrochromic compounds. Such components may include inert, current-carrying electrolyte(s), thickening agents (such as, for example, non-cross-linked polymers like polymethylmethacrylate), tinting agents and UV-stabilizing agents. UV-stabilizing agents inhibit degradation of components of an electrochromic layer upon exposure of the layer to ultraviolet (UV) radiation.

The '108 Patent, among others, describes certain advantages realized by thickening or gelling solutions used in single-compartment, self-erasing, solution-phase electrochromic devices. One of the problems associated with such devices is that of segregation. When operated continuously for long periods of time, the oxidized form of the anodic and reduced form of the cathodic electrochromic materials in such devices tend to segregate. Gelling or thickening the solutions of the electrochromic device reduces the component of segregation that is due to natural convection of the electrochromic medium, thereby reducing the extent of segregation and its undesirable effects, such as uneven coloring or clearing.

Thickening or gelling the solution in electrochromic devices also creates the advantages of slower spreading of solution, restricted shattering and easier clean-up in the case of breakage of the device.

Electrochromic solutions gelled or thickened through the use of materials, such as colloidal silica or acrylic fibers, which do not involve covalent cross-linking of polymer chains, have been described. See Manos, U.S. Pat. No. 3,451,741; Shelepin et al., USSR Patent Publication No. 566,863; and the '108 Patent.

Thickened or gelled electrochromic solutions in the art suffer from a number of shortcomings that have restricted or prevented the practical application of electrochromic devices to provide variable transmittance or variable reflectance in a number of contexts. Perhaps the most important of these contexts is apparatus, such as windows or large outside rearview motor vehicle mirrors, where devices with solution layers of large area, more than about 0.1 m on a side, are oriented nearly vertically (i.e., nearly parallel to the lines of force of the gravitational field of the Earth) or are otherwise subjected to conditions which entail significant hydrostatic pressure and concomitant large forces pushing outwardly from the solution against the walls of the device. Thus, in these large area apparatus, hydrostatic pressure makes solution-phase electrochromic devices susceptible to breakage, for example due to rupture of seals holding walls of the electrochromic device together. Even when there is not breakage, the hydrostatic pressure causes bowing out of the walls of the electrochromic device, which results in non-uniform thickness in the solution layer and undesirably non-uniform coloring and clearing during operation of the device.

Solutions thickened by prior art methods, although thickened to the point of reducing flow, are not "free-standing" or permanent gels (see Sperling, Introduction to Physical Polymer Science, John Wiley & Sons, Inc., New York, N.Y., 2 nd ed. (1992)). In free-standing (permanent) gels, solution is interspersed and entrapped in a polymer matrix and continues to function as a solution. Because solutions thickened by prior art methods (e.g., Shelepin et al., supra; '108 Patent) are not free-standing gels, the fluid in them is not entrapped in a polymer matrix and, consequently, still exerts undesirable hydrostatic pressure and concomitant device-breaking or device-distorting forces in large area devices.

However, the use of free-standing (permanent) gels to create a workable electrochromic device is not trivial. To create a free-standing gel some amount of polymerization and/or crosslinking is necessary and, generally when polymerization and/or crosslinking takes place, the volume of the crosslinked polymer is smaller than the pre-crosslinked monomers. This polymerization and crosslinking can take place substantially simultaneously in an electrochromic device, i.e., in situ polymerization. However, there are limitations with in situ polymerization. To obtain a free-standing gel through in situ polymerization, some of the monomers must have a functionality greater than two. If polymerization and crosslinking takes place in the device, there is a significant amount of shrinkage in the polymer solution. This shrinkage causes the solid polymer to crack, craze and form voids, all of which adversely affects the usefulness of the final device. Furthermore, the detrimental effects will sometimes not be noticed for some time since polymerization and crosslinking can occur over a period of weeks. If, on the other hand, only polymerization, and no crosslinking takes place, a "free standing" polymer will not form and hydrostatic pressure will build up and adversely affect the operability of the final device. Therefore, it is important to have sufficient polymerization and crosslinking to create a free-standing gel while avoiding a significant amount of shrinkage.

This polymerization and/or crosslinking can be initiated by chemical-, thermal- or UV-type initiators. A common method of UV curing can be accomplished by adding a constituent that, when exposed to UV light, will form a radical to initiate polymerization and/or crosslinking. Difficulties arise with UV curing because not all the radicals are consumed to initiate a reaction and/or self-react and are therefore present in the device after "final cure" of the polymer gel. These radicals may also be later induced into their reactive state by subsequent UV radiation experienced by a typical electrochromic device during its lifetime. As more reactive species are produced, further polymerization and/or crosslinking will occur thereby changing the gel properties and further degrading the gel. This is especially true in UV stabilized devices which utilize UV absorbing materials. In addition, the electrochromic materials may interfere with light absorption or initiation and may inhibit or retard the polymerization process. Thus UV curing is not presently preferred.

An electrochromic solution gelled or thickened with the use of a covalently cross-linked polymer matrix of 1-vinyl-2-pyrrolidinone-co-N,N'-methylbisacrylamide and used in providing color to an electrochromic device has been described. Tsutsumi et. al., J. Polymer Sci. A, 30, 1725–1729 (1992).

It would clearly be desirable, then, to provide, as media of reversibly variable transmittance for electrochromic devices, electrochromic layers that behave as free-standing gels and that, as such, do not flow at perceptible rates and do not "weep" or exude liquid (leak fluid by syneresis, see Sperling, supra) but retain functional characteristics of a solution allowing for diffusion of electrochromic species. It would be especially desirable if such a layer would adhere to the electrode layers on the walls of such a device to further counteract separation of the electrode layers and walls. Further, it would be desirable if such a layer would be tough and rubbery and behave similarly to the lamination layer in laminated safety glass. Such electrochromic layers would substantially eliminate problems presented by hydrostatic pressure and the concomitant forces when solutions, and even conventionally thickened solutions, are used to provide variable transmittance in electrochromic devices. Finally, it would be desirable if such a layer would not shrink to such an extent that the usefulness of the final device is compromised.

However, electrochromic layers which would have such favorable structural, flow and electrode-layer-adherence properties would be chemically complex. Consequently it is not straightforward to provide such an electrochromic layer that retains other characteristics that are important for practical applications of media of reversibly variable transmittance in electrochromic devices, especially such devices which are desirably solution-phase, single-compartment and self-erasing.

These other characteristics, which are necessary or important for practical applications of electrochromic layers, include, without limitation, the following. Such a layer, particularly in applications such as automobile mirrors or automobile or airplane windows, should not shrink significantly when polymerized and/or crosslinked, separate into solid and fluid phases, weep, or sag when subjected to vibration. Weeping and sagging should also be avoided in other applications, such as interior or exterior building windows. The electrochromic layer should not be hazy or cloudy. The compositions, which are part of the electrochromic layer and afford the layer its favorable structural, flow and adherence characteristics, must not be involved in undesirable interactions with other components of the layer. For example, the cycle life of the layer should not be seriously degraded by constituents of the polymer matrix. This is very important in the field of electrochromics where even small impurities can significantly influence the successful operation of a device. Also, if an initiator or a catalyst is employed in making a polymer that is part of the layer, the initiator or catalyst should not undergo reactions with electrochromic compounds in the layer, in their zero-potential equilibrium or electrochemically activated (reduced or oxidized) states. If a polymer is part of the electrochromic layer and involved in an interaction with the electrode layers that causes the electrochromic layer to adhere to the electrode layers, the polymer should not significantly interfere with the function of the electrode layer in electron transfer to or from electrochromic species in the layer. The compositions which provide the desirable structural, flow and adherence characteristics to the electrochromic layer should not cause the layer to be so unstable to ultraviolet (UV) radiation that the layer cannot be made sufficiently stable by other measures, such as addition of UV-stabilizing agents to the solution in the layer. The compositions which provide the desirable structural, flow and adherence characteristics to the electrochromic layer should not interfere with the coloring and clearing times of a device to an extent that would render use of the device impractical. The compositions which provide the desirable structural, flow and adherence characteristics to the electrochromic layer should not significantly complicate construction or assembly of an electrochromic device in which the layer provides reversibly variable transmittance. Thus, for example, it would be desirable to be able to fill a device with all components of an electrochromic layer, including those that afford the favorable structural, flow and adherence characteristics, before the layer loses its ability to flow. Finally, the reactions to provide an electrochromic layer its favorable structural, flow and adherence properties should be completed soon after the reactions are started. For example it is undesirable to have significant polymer formation continuing in an electrochromic layer inside a device for more than a few days, because the layer may shrink with time or the performance characteristics (e.g., color in the clear state, coloring and clearing times, uniformity of coloring) of the layer and the device that includes the layer would then undesirably change over time.

The present invention fills a need in the art for an electrochromic layer which has the advantageous structural, flow and electrode-layer-adherence properties described above for use of the layer to provide variable transmittance or reflectance in a large-area electrochromic device and, at the same time, has other characteristics which make the layer acceptable for practical applications in single-compartment, self-erasing electrochromic devices that also function as solution-phase devices.

SUMMARY OF THE INVENTION

One embodiment of the present invention provides an electrochromic layer of reversibly variable transmittance to light which comprises:

(a) a polymer matrix of a polyol polymer wherein the polyol polymer chain molecules ("chains") are covalently cross-linked through hydroxyl groups; and (b) an electrochromic solution which comprises an anodic and a cathodic electrochromic compound interspersed in the polymer matrix.

Another embodiment of the present invention provides a method for forming a preferred electrochromic layer having reversibly variable transmittance to light comprising the steps of:

(a) purifying at least one monomer having a vinyl group and a crosslinking group;

(b) pre-polymerizing at least one monomer through an addition reaction to create at least one polymer with a viscosity sufficient to allow insertion into an electrochromic device;

(c) adding a crosslinker with a functionality of at least two, and a cathodic and/or anodic electrochromic material and inserting the resulting mixture into an electrochromic device; and (d) crosslinking the mixture within the device.

Another embodiment of the present invention provides a method for forming a preferred electrochromic layer having reversibly variable transmittance to light comprising the steps of:

(a) purifying at least one monomer having a vinyl group and a crosslinking group comprising a glycidyl or a vinyl ether;

(b) pre-polymerizing at least one monomer through an addition reaction to create at least one polymer with a viscosity sufficient to allow insertion into an electrochromic device;

(c) adding a cathodic and/or anodic electrochromic material and inserting the resulting mixture into an electrochromic device; and (d) crosslinking the mixture within the device.

Another embodiment of the present invention provides a presently preferred electrochromic layer, having reversibly variable transmittance to light, and comprising:

(a) at least one pre-polymerized polymer having a glycidyl or a vinyl ether functionality capable of crosslinking;

(b) a solvent; and (c) at least one solution based electrochromic material interspersed in the polymer matrix.

Yet another embodiment of the present invention provides the preferred electrochromic layer having reversibly variable transmittance to light, that comprises:

(a) at least one pre-polymerized polymer having a vinyl group and a crosslinking group;

(b) a solvent;

(c) a crosslinker with a functionality of at least two; and (d) at least one solution based electrochromic material interspersed in the polymer matrix.

Surprisingly, the electrochromic layers of the invention are free-standing gels ("permanent" gels) in which the electrochromic solution is interspersed or dissolved in the polymer matrix. The electrochromic solution has the electrochromic compounds and possibly other components (e.g., thickeners, UV-stabilizers, inert current-carrying electrolyte) dissolved in a solvent and functions as a solution notwithstanding being interspersed in the polymer matrix.

Because they are free-standing gels and surprisingly, in many cases, do not significantly weep, the electrochromic layers of the invention avoid problems due to hydrostatic pressure of fluids in large-area electrochromic devices in which the layers of the invention are the media of reversibly variable transmittance.

The electrochromic layers of the invention surprisingly adhere strongly to the electrode layers of the devices in which the electrode layers are the media of reversibly variable transmittance and, also surprisingly, in such adherence do not interfere significantly with the electron transfer functions of the electrode layers.

Also, unexpectedly, the electrochromic layers of the invention have many of the other characteristics, which are necessary or important for practical applications of electrochromic layers as media of reversibly variable transmittance in electrochromic devices. The layers form rapidly. Although, they are generally easily made in situ inside a device after filling a device with a precursor fluid, as will be discussed below, it is preferred that monomers be used rather than the precursor fluid and that the monomers be pre-polymerized prior to being inserted into the device. After pre-polymerization and insertion into the device, the polymers are easily crosslinked. The polymer matrix surprisingly does not impede coloring or clearing to an extent that poses a problem, for practical applications of the electrochromic layers. The reagents used in forming the polymer matrix surprisingly do not interact with components of the electrochromic solution to an extent that precludes practical, commercial applications of the electrode layers. The interactions between the polymer matrix and its low molecular weight monomers or precursors and solvents of the electrochromic solution, especially propylene carbonate and other cyclic ester solvents, are surprisingly favorable. This serves to avoid precipitation of polymer matrix precursors before the polymer matrix can be formed, serves to maintain the integrity and open structure of the polymer matrix which, in turn, limits interference of the matrix with the interspersed solution and phenomenona occurring therein, serves to hold the solvent inside the matrix and thereby usually avoid weeping (syneresis, and serves usually to avoid haziness or cloudiness in the layer. The layers of the invention have other favorable characteristics as well.

The invention also provides electrochromic devices, which comprise electrochromic layers of the invention as the media of reversibly variable transmittance, and apparatus, such as variable transmittance windows, variable reflectance mirrors, and display devices which employ such light-filters or mirrors in conveying information which comprise electrochromic devices of the invention as the component that provides reversibly variable transmittance.

ADDITIONAL DETAILS OF THE INVENTION

For many details of the invention, reference may be had to the various disclosures incorporated herein by reference, and especially the '108 Patent and U.S. Pat. Nos. 5,202,787, 5,278,693, 5,280,380, and 5,294,376.

For synthesis of preferred cathodic electrochromic compounds for use in the invention, and various salts thereof, reference may be had to U.S. Pat. No. 5,294,376 and Example 1 below. Preferred among these cathodic compounds are salts, preferably the difluoroborate salt, of a dication selected from the group consisting of N, N'-substituted dipyridyls with hydrogen at all of the 2, 2', 6, and 6' positions and with the N and N' substituents being the same or different and each being selected from the group consisting of alkyl groups of 1–10 carbons, phenyl, benzyl, 2-phenylethyl, 3-phenyl(n-propyl), and 4-phenyl(n-butyl) and N, N'-substituted dipyridyls with an alkyl group of 1–4 carbons at each of the 2, 2', 6, and 6' positions and with the N and N' substituents being the same or different and each being selected from the group consisting of alkyl groups of 1–10 carbons, benzyl, 2-phenylethyl, 3-phenyl(n-propyl), and 4-phenyl(n-butyl). Most preferred among these is 1,1'-di(3-phenyl(n-propyl))-4,4'-dipyridinium.

Preferred among the anodic electrochromic compounds are 5,10-dihydro-5,10-dimethylphenazine, N,N,N'.N'-tetramethyl-p-phenylene-diamine, N,N,N',N'-tetraphenyl-p-phenylene-diamine, bis-3,3'-diethyl-2,2'-benzothiazole azine, and tetrathiafulvalene. Most preferred is 5,10-dihydro-5,10-dimethylphenazine.

For tinting of electrochromic solutions, see especially U.S. Pat. No. 5,278,693.

For UV-stabilizing agents, see especially U.S. Pat. No. 5,280,380. Preferred are ethyl 2-cyano-3,3-diphenyl acrylate (Viasorb) and 2(2'-hydroxy-5'methylphenyl) benzotriazole (sold by Ciba-Geigy, (Tarrytown, N.Y.) under the name "Tinuvin p")

The most preferred solvent for use in the electrochromic solutions of the electrochromic layers of the invention is propylene carbonate. Other solvents are acceptable, and among these cyclic esters are preferred, such as propylene carbonate, isobutylene carbonate, gamma-butyrolactone, gamma-valerolactone, any homogeneous mixture that is liquid at room temperature of any two or more of propylene carbonate, isobutylene carbonate, gamma-butyrolactone, and gamma-valerolactone, and any homogenous mixture that is liquid at room temperature of any one or more of propylene carbonate, isobutylene carbonate, gamma-butyrolactone, and gamma-valerolactone with ethylene carbonate.

Generally, the polymer matrices of electrochromic layers according to the present invention may comprise commercially available materials which may be pre-polymerized outside the device and crosslinked in the device (see Example 9) or, they may be simultaneously polymerized and crosslinked in the device. Although these commercially available precursors work very well when used in electrochromic devices, they have a small amount of impurities present which, as stated above tend to adversely affect the cycle life of a device. Therefore, in accordance with a preferred embodiment of the present invention, the electrochromic layers may comprise copolymers which are pre-copolymerized outside the device and crosslinked in the device. This pre-polymerization preferably takes place in the solvent which will be used in the final electrochromic device. For very high cycle life, the monomers which will be polymerized are purified, e.g., distilled, prior to pre-polymerization to remove any impurities which may hinder the proper operation of the electrochromic device.

If commercially available materials are used, they may entail polyols with hydroxyl functionalities of at least 2, i.e., polymer molecules with at least two hydroxyl groups that can react with other functional groups, such as, among others, isocyanate groups, metal alkoxide groups, or ketene groups. In the polymer matrices, the polyols are crosslinked by molecules or a bridging compound, which in turn have at least two functional groups that can react with the reactive hydroxyls of the polyols. Thiols, which as a class have higher reactivity than similar alcohols can also be used.

As the skilled will understand, in order to form a polymer matrix, i.e. a polymer in which linear chains are covalently cross-linked, it is necessary that either the polyol has an hydroxyl functionality of greater than 2 or the bridging compound has a group which can react with the reactive hydroxyls of the polyol to form a covalent bond and which has a functionality greater than 2.

Preferred among the polyols which can be employed to form the polymer matrices of the electrochromic layers of the invention are polyester polyols, such as Desmophen 1652 (made by Miles, Inc., average molecular weight 2000 daltons, hydroxyl functionality 2, made with diethylene glycol, ethylene glycol, 1,4-butane diol, and adipic acid), Desmophen 1700, and Desmophen R-18 A (made by Miles, Inc., average molecular weight 2500 daltons, hydroxyl functionality approximately 2.7, made from diethylene glycol, trimethylol propane, and adipic acid); polyacrylate polyols, such as the polyol made by polymerizing the caprolactone acrylate SR-495; and polyether polyols, such as Desmophen 550U (made by Miles, Inc., average molecular weight 440 daltons, hydroxyl functionality 3, made from propylene oxide and started on trifunctional material), Desmophen 1600U (made by Miles Inc., average molecular weight 1000 daltons, hydroxyl functionality 2, made from propylene oxide and started on difunctional material), Desmosphen 1900U (made by Miles, Inc., same as Desmophen 1600U except average molecular weight of 2000 daltons), and Desmophen 1915U.

To crosslink the polyols, preferred are compounds with isocyanate groups (to form a type of "polyurethane"), such as Desmodur N-100 or Desmodur 3300-N; bisketenes, and metal alkoxides, such as tetramethyl or tetraethyl orthosilicate or titanium(IV)isopropoxide.

The amount of polymer matrix present in the electrochromic layers of the invention is preferably from about 50% by weight of the layer down to the percentage at which a free-standing gel is barely formed with the electrochromic solution at room temperature. This lower limit is easily ascertained by routine experimentation by simply making a series of compositions that vary in weight fraction of components to make the matrix to ascertain the weight fraction that is required form free-standing gel formation at room temperature. Typically, for example, with polyacrylate polyols made with SR-495 caprolactone acrylate, the polymer matrix will need to be at least 5 wt. % of the electrochromic layer. With Desmophen 1700, typically at least about 20 wt. % of the electrochromic layer will need to be polymer matrix material.

Alternatively, and in accordance with the preferred embodiment of the present invention, the polymer matrix may comprise at least one polymer based on the vinyl polymerization of a molecule having the general formula:

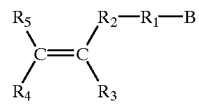

where $R_1$ is optional and may be selected from the group consisting of: alkyl, cycloalkyl, poly-cycloalkyl, heterocycloalkyl, carboxyl and alkyl and alkenyl derivatives thereof; alkenyl, cycloalkenyl, cycloalkadienyl, poly-cycloalkadienyl, aryl and alkyl and alkenyl derivatives thereof, hydroxyalkyl; hydroxyalkenyl; alkoxyalkyl; and alkoxyalkenyl where each of the compounds has from 1 to 20 carbon atoms. $R_2$ is optional and may be selected from the group consisting of alkyl, cycloalkyl, alkoxyalkyl, carboxyl, phenyl and keto where each of the compounds has from 1–8 carbon atoms; and oxygen. $R_3$, $R_4$, and $R_5$ may be the same or different and may be selected from the group consisting of: hydrogen, alkyl, cycloalkyl, poly-cycloalkyl, heterocycloalkyl, and alkyl and alkenyl derivatives thereof; alkenyl, cycloalkenyl, cycloalkadienyl, polycycloalkadienyl, aryl and alkyl and alkenyl derivatives thereof; hydroxyalkyl; hydroxyalkenyl; alkoxyalkyl; alkoxyalkenyl; keto; acetoacetyl; vinyl ether and combinations thereof, where each of the compounds has from 1 to 8 carbon atoms. Finally, B may be selected from the group consisting of hydroxyl; cyanato; isocyanato; isothiocyanato; epoxide; silanes; ketenes; acetoacetyl, keto, carboxylate, imino, amine, aldehyde and vinyl ether. However, as will be understood by those skilled in the art, if B is an cyanato, isocyanato, isothiocyanato, or aldehyde it is generally preferred that $R_1$, $R_2$, $R_3$, $R_4$, and $R_5$ not have a hydroxyl functionality.

Preferred among the monomers is methyl methacrylate; methyl acrylate; isocyanatoethyl methacrylate; 2-isocyanatoethyl acrylate; 2-hydroxyethyl methacrylate; 2-hydroxyethyl acrylate; 3-hydroxypropyl methacrylate; glycidyl methacrylate; 4-vinylphenol; acetoacetoxy methacrylate and acetoacetoxy acrylate.

Particularly preferred among the monomers is methyl methacrylate; 2-isocyanatoethyl methacrylate; 2-hydroxyethyl methacrylate; and glycidyl methacrylate.

Additionally, for the preferred embodiments of the present invention, the monomers should be purified. Surprisingly, electrochromic devices are sensitive to impurities, which is shown through poor cycle life, darkening of the electrochromic material in its bleached state, and poor UV stability. Although the commercial precursors described in detail hereinabove are fairly pure and perform adequately as ordered, purification would improve their performance. They can not, however, be readily purified by distillation because their low vapor pressure makes even vacuum distillation difficult or impossible. Thus, the monomers of the present invention which can be purified are a significant advance in ensuring proper performance of an electrochromic device. This purification may be through chromatography, distillation or other purification techniques well known in the art.

The monomers of the preferred embodiment of the present invention should also preferably be capable of pre-polymerization as shown in examples 9 and 13–20. By pre-polymerization we mean that the monomers and/or precursors react with one another to produce relatively long and relatively linear polymers. This pre-polymerization is substantially free of any crosslinking reactions, and is generally accomplished as follows. A certain amount of the monomer(s) is dissolved in a suitable solvent (described in detail hereinabove). The solution may be optionally purged with an inert gas such as nitrogen, argon or helium and at least one electrochromic species may optionally be added. The polymerization reaction is initiated by known techniques, e.g., heat and/or chemical initiator such as azo or peroxide initiators, and long and primarily linear chains of the polymer are built through a simple addition reaction. Addition reactions are the presently preferred method for pre-polymerization and for crosslinking because as the reaction proceeds no by-products are evolved. However, it is possible to utilize non-addition reactions, e.g., condensation, as long as the by-products evolved can be removed or do not adversely affect the operation of the electrochromic layer or the overall electrochromic device.

These polymer chains will remain dissolved in the solvent and can have molecular weights ranging from about 1,000 to about 300,000, although those skilled in the art will understand that molecular weights of up to 3,000,000 are possible under certain conditions. It is presently preferred that the solvent be the same or compatible with the solvent or combination of solvents that will be used in the final device. Otherwise the solvent must be removed form the pre-polymerized polymer, leaving the polymer dried out. Once dried out, some polymers may not regain the "open structure" important to ensure that the electrochromic materials can diffuse therethrough. It is presently believed that this structure is obtained because the solvent molecules are attracted to the polymer chain to such an extent that the solvent keeps the chains separated from one another. The electrochromic species, the UV blocker and/or other optional material(s) may be added before pre-polymerization occurs or, preferably, prior to inserting pre-polymerized polymer solution into the device.

It should be understood that more than one monomer may be pre-polymerized together. Equation [1] shows the general formula for the monomers of the preferred embodiment of the present invention. Generally, any of the combinations of the monomers shown may be combined into one or more polymers (i.e., a polymer, a copolymer, terpolymer, etc.) in the pre-polymerization process. For example, one monomer may be polymerized to give a homogeneous polymer material such as poly(2-hydroxyethyl methacrylate), poly(2-isocyanatoethyl methacrylate), and the like. However, it is generally preferred that a species with a crosslinking reactive component (e.g., hydroxyl, acetoacetyl, isocyanate, thiol etc.) be combined with another species either having the same crosslinking reactive component or no crosslinking reactive component (e.g., methyl methacrylate, methyl acrylate, etc.). If a copolymer is produced, the ratio of the monomers without and with the crosslinking components may range from about 200:1 to about 1:200. Although the following description relates to copolymers, it will be understood by those skilled in the art that more complex structures (terpolymers, etc.) may be made using the same teachings.

For example, hydroxyethyl methacrylate (HEMA) may be combined with methyl methacrylate (MMA) to form a copolymer. The ratio of HEMA to MMA may range form about 1:3 to about 1:50 with the preferred ratio being about 1:10. The preferred crosslinker for any of the pre-polymers having a hydroxyl (or any reactive group having an active hydrogen, such as thiol, hydroxyl, acetoacetyl, urea, melamine, urethane, etc.) is an isocyanate, isothiocyanate, and the like having a functionality greater than one. These isocyanates may be the same as those described hereinabove, or may be aliphatic or aromatic.

Also, 2-isocyanatoethyl methacrylate (IEMA) may be combined with MMA in the ratio of about 1:3 to about 1:50 with the preferred ratio of about 1:20. crosslinking of a group containing an isocyanate can occur with any compound containing a reactive hydrogen, such as hydroxyl, thiol, acetoacetyl, urea, melamine, urethanes, with hydroxyl being presently preferred. These should have a functionality greater than one and may be the same as those described hereinabove, aliphatic or aromatic compounds or, preferably, may be 1,3-hydroxy benzene.

Other preferred combinations are glycidyl methacrylate (GMA) and MMA or vinyl ethers/MMA in the ratio of about 1:1 to about 1:50. One significant advantage with GMA/MMA and/or vinyl ethers/MMA is that no crosslinking agent is required. Although not wanting to be limited by any specific theory, it is presently believed that the preferred viologen present as the cathodic component of the electrochromic material initiates the crosslinking reaction with the GMA and vinyl. Although the crosslinkers of the preferred embodiments of the present invention do not presently impede the operation of the electrochromic device, it is still desirable to remove any species not necessary to ensure proper operation. Thus, if GMA is utilized, no crosslinking agent is necessary.

A viologen has also been shown to catalyze the polymerization of vinyl ethers. It is believed that the viologen serves as a cationic initiator for the polymerization of vinyl ethers. Vinyl ethers undergo cationic polymerization but do not readily undergo radical or anionic polymerization. Acrylates and methacrylates undergo radical and anionic polymerization but do not readily undergo cationic polymerization. This selectivity can be exploited if, for example, a monomer with both acrylate and vinyl ether functionality were used to build a polymer via radical polymerization through the acrylate functionality and then the polymer was crosslinked in an electrochromic device through cationic polymerization initiated by the viologen.

It is also possible to crosslink the gel with the same or similar functionality that is used to build molecular weight or a functionality that would not survive, or remain intact, during the initial polymerization reaction. This can be done by, among other mechanisms, taking the IEMA/MMA co-polymer (after polymerization) and adding HEMA monomer to it. The HEMA monomer would attach to the IEMA/MMA polymer through the alcohol/isocyanate addition reaction and in essence replace the isocyanate functionality with a methacrylate functionality. The polymer could then be crosslinked in the device by free radical polymerization using UV or thermal free radial initiators. In this manner, it would also be possible to add vinyl ether functionality to the IEMA/MMA co-polymer. Hydroxy butyl vinyl ether could be added to the IEMA/MMA co-polymer to replace the isocyanate functionality with vinyl ether functionality through the isocyanate/alcohol addition reaction. These examples demonstrate how the functionality of the at least one polymer, i.e., polymer, copolymer, terpolymer, etc., can be changed after the initial polymerization reaction has occurred.

In accordance with the presently most preferred aspect of the present invention, two copolymers may be combined such that they crosslink with one another. For example HEMA/MMA may be combined with IEMA/MMA and the hydroxyl groups of HEMA will self-react with the isocyanate groups of IEMA to form an open polymeric structure. It should be understood that the rates of crosslinking for any of the polymers described herein can be controlled by proper selection of the reactive crosslinking species employed. For example, reaction rates can be increased by using an aromatic isocyanate or an aromatic alcohol or both. Reaction rates can be decreased, for example, by using sterically hindered isocyanates or sterically hindered alcohols or both.

It should also be understood that several interrelated factors affect the properties of the final polymer solution. The "concentration" of the crosslinking component within the at least one polymer, the concentration of the crosslinker, and the concentration of the overall polymer solution in the solvent all combine to influence the polymer solution and final gel properties. The properties of the polymer solution may be substantially similar even with an increase in the concentration of the crosslinking component if there is no change in the "concentration" of the crosslinking species or, if there is a concomitant decrease in the over concentration in the solvent. Therefore, any combination of the above factors resulting in a free-standing gel which also allows sufficient ion mobility should be understood to be within the scope of the present invention. However, as stated above, the amount of polymer matrix present in the electrochromic layers of the invention is preferably from about 50% by weight of the layer down to the percentage at which a free-standing gel is barely formed with the electrochromic solution at room temperature. This lower limit is easily ascertained by routine experimentation by simply making a series of compositions that vary in weight fraction of components to make the matrix to ascertain the weight fraction that is required to form a free-standing gel formation at room temperature.

The gelled system of the present allows a surface-confined system to be combined with a gelled solution phase system to form a hybrid electrochromic device. For example, a cathodic surface-confined metal oxide (e.g., tungsten oxide, molybdenum oxide, etc.) may be combined with an anodic component (ferrocene, 5,10,dihydro-5,10 dimethylphenazine, etc.) in a gelled solution-phase free-standing polymer.

The invention is described in somewhat more detail in the following, non-limiting examples. "Room temperature" means 20° C.–27° C., typically 23° C.–25° C. Unless otherwise specifically noted, all volumes and concentrations described herein are at room temperature.

EXAMPLE 1

Synthesis of 1,1'-di(3-phenyl(n-propyl))-4,4'-dipyridinium

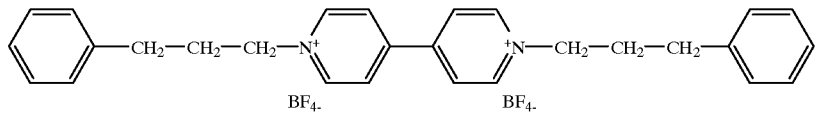

The compound was made starting with the known compounds, 4,4'-bipyridine and 1-bromo-3-pheny propane, of formulas

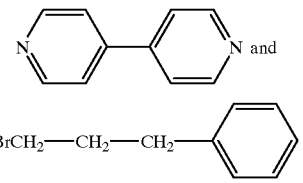

respectively. A solution of 10 g of 4,4-bipyridine and 38.9 ml of 1-bromo-3-phenylpropane was dissolved in 150 ml of acetonitrile. The solution was refluxed for about 24 hours. The yellow precipitate was filtered off by vacuum filtration. The precipitate was then slurried in an excess of acetone and aaain vacuum filtered. The yellow precipitate was then dried at 60° C.

The dried, yellow precipitate was dissolved in 600 ml of warm water and the solution was carbon treated and filtered. To this solution an aqueous solution of sodium fluoroborate was added to provide a slight excess of fluoroborate ions.

The solution was heated to about 90° C. and was treated with carbon. The hot solution was filtered and cooled.

Upon cooling, white crystals and yellow precipitate formed which were separated by filtration. The solids were recrystallized from water with carbon treatment to yield a white precipitate. This precipitate was collected and dried to give 22.8 grams of the desired product (62.7% yield). The elemental analysis was as follows:
Found: C 58.7 H 5.4 N 4.9 F 21.7 B 4.7
Calculated: C 59.2 H 5.3 N 4.9 F 26.8 B 3.8

EXAMPLE 2

Electrochromic Layer Comprising a Polymer Matrix from Polyester Polyol Chains Joined by Isocyanates Reacting with Hydroxyls An electrochromic layer comprising a polymer matrix made by linking polyester polyol chains through hydroxyl groups of the chains was prepared as follows. 8.0 g of 0.08 M 1,1'-dibenzyl-2,2',6,6'-tetramethyl-4,4'-bipyridinium difluoroborate in propylene carbonate, 8.0 g 0.08 M 5,10-dihydro-5,10-dimethylphenazine in propylene carbonate, 3.52 g of Desmophen 1700 (a polyester polyol sold by Miles, Inc., Pittsburgh, Pa., USA, made from adipic acid and diethylene glycol, having an average molecular weight of 2550 daltons and an hydroxyl functionality of 2) and 0.48 g of Desmodur N-100 (a polymer of hexamethylene diisocyanate comprising biuret groups, having an isocyanate functionality near 3, sold by Miles Inc.) and one drop of catalyst (dibutyltin dilaurate, Aldrich, Milwaukee, Wis.) were mixed in a glass vial. The electrochromic layer was gelled by baking the vial at 75° C. for 1 hr. An electrochromic layer with a covalently cross-linked, covalently-bonded polymer matrix formed which was transparent to visible light. The layer shows no signs of weeping.

A solution with the composition of that described in the preceding paragraph was prepared and used to fill a device which was approx. 2 in.×approx. 10 in. in cross-section. The device was single-compartment and self-erasing (see the '108 Patent). The electrode layers of the electrode-layer-bearing walls of the device were transparent, made of fluorine-doped tin oxide, had a sheet resistance of about 20 ohms per square, were substantially planar and parallel (like the sheets of glass to which they were adhered), and were spaced apart by about 0.0125 cm by a perimeter seal. The device was vacuum filled with the solution through a small gap in the perimeter seal and after filling the small gap was plugged with a UV-cure adhesive.

The electrochromic layer was then gelled by heating the device at 75° C. for 1 hr.

EXAMPLE 3

Antiscattering Qualities of an Electrochromic Layer Comprising a Polymer Matrix from Polyester Polyol Chains Joined by Isocyanates Reacting with Hydroxyls An electrochromic device containing a polyurethane electrochromic layer was prepared as follows. 48.0 g of 0.08 M 1,1'-dibenzyl-2,2',6,6'-tetramethyl-4,4'-bipyridinium difluoroborate in propylene carbonate, 48.0 g 0.08 M 5,10-dihydro-5,10-dimethylphenazine in propylene carbonate, 21.12 g of Desmophen 1700, 2.88 g of Desmodur N-100, and 2 drops of catalyst (dibutyltin dilaurate, Aldrich, Milwaukee, Wis.) were mixed together and used to fill an electrochromic mirror as detailed in Example 2. Then polymer matrix formation (gelling) was carried out by heating to 85° C. for 25 minutes.

Adhesive tape was placed on the back of the mirror. A 1 kg metal sphere was dropped on the mirror from a height of approximately 1 m. Inspection revealed that no electrochromic solution had leaked from the broken mirror and there was no evidence that the glass fragments had become separated from the electrochromic layer.

Additionally, two complete interior automobile rearview mirrors containing the above described electrochromic layer were constructed and tested. The mirrors were subjected to simulated crash testing (General Motors specification test) with no sign of solution leakage or separated glass fragments. The shards of both pieces of glass adhered strongly to the electrochromic layer, and could only be separated with difficulty after impact testing.

EXAMPLE 4

Solution-Phase Electrochromic Device Comprising an Electrochrcmic Layer Comprising a Polymer Matrix from Polyester Polyol Chains Joined by Isocyanates Reacting with Hydroxyls An electrochromic solution of 15 g 0.080 M 1,1'di(3-phenyl(n-propyl))-4,4'-di-pyridinium difluoroborate in propylene carbonate, 15 g of 0.080 M 5,10-dihydro-5,10-dimethylphenazine in propylene carbonate, 8.68 g Desmophen 1700, 1.08 g Desmodur N-3300 (a polymer of hexamethylene diisocyanate based on an isocyanurate ring of 3 hexamethylene diisocyanate molecules, having an isocyanate functionality of approximately 3, sold by Miles, Inc.) and one drop of dibutyltin dilaurate (Aldrich Chemical Company, Inc., Milwaukee, Wis.) were placed in an electrochromic device constructed according to previous examples and afterwards the device was sealed.

The device was baked at 80° C. for 1 hour to gel the electrochromic layer.

The device with the gelled electrochromic layer initially had a transmittance of 79% in the clear (zero-potential equilibrium) state. After 55,000 cycles at 70° C. (each cycle being 30 seconds on at 1.2 V DC potential difference across the electrochromic layer followed by 30 seconds off (short circuit between electrode layers)), the transmittance in the clear state was still slightly more than 63%.

EXAMPLE 5

Solution-Phase Electrochromic Device Comprising an Electrochromic Layer Comprising a Polymer Matrix Made from Polyacrylate Polyol Chains Joined by Isocyanates Reacting with Hydroxyls and Present at Low Weight Percent of the Layer A stock solution of 10 weight percent of a high molecular weight polyol was prepared as follows. 225 g of propylene carbonate, 25 g SR-495 caprolactone acrylate monomer (Sartomer Co., West Chester Pa., USA),
formula:

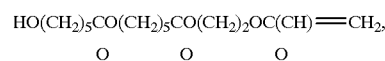

and 1 gazothermal initiator (V-601) (dimethyl 2,2'-azobis(2-methylpropionate), Wako Chemicals USA, Inc., Richmond, Va., USA) were added to a three-neck round bottom flask and heated to 120° C. while stirring for 4 hours under a nitrogen atmosphere.

To the approximately 250 g of polymer solution, 5.68 g of 1,1'-di(3-phenyl(n-propyl))-4,4'-dipyridinium difluoroborate and 2.10 g 5,10-dihydro-5,10-dimethylphenazine were stirred in and dissolved at room temperature.

To 5 g of the resulting solution, 2.5 g of 0.08 M 1,1'-di (3-phenyl(n-propyl))-4,4'-dipyridinium difluoroborate in propylene carbonate, and 2.5 g of 0.08 M 5,10-dihydro-5,10-dimethylphenazine in propylene carbonate were added to lower the total caprolactone acrylate monomer concentration to 5 weight percent. To this was added 0.15 g isophorone diisocyanate (5-isocyanato-1-(isocyanatomethyl)-1,3,3-trimethylcyclohexane)(Aldrich Chemical Co., Inc., Milwaukee, Wis., USA) and 1 drop dibutyl tin dilaurate (Aldrich Chemical Co.) as catalyst.

The solution was inserted into 1×2 inch electrochromic windows, prepared as in Example 2, and the window perimeter was then sealed. The windows were baked at 100° C. for 1 hour to form the polymer matrix of the electrochromic layer. The coloring and clearing speeds of this low polymer weight percent composition approached those of electrochromic devices without the polymer matrix, despite the fact that the composition was a free-standing system of polymer matrix with interspersed electrochromic solution.

In this system, some weeping and cloudiness of the electrochromic layer were observed.

EXAMPLE 6

Haze-Free, Non-Weeping Electrochromic Layer with UV Stabilizer

A 250 g 10-weight percent stock solution of high molecular weight SR-495 (Sartomer Co.) polyol was prepared as in Example 5. To 125 g of this stock solution, 16 g of the UV-stabilizer Viasorb 910 (ethyl 2-cyano-3,3-diphenyl acrylate) (Aceto Corporation, Flushing, N.Y.) and 2.1 g of 5,10-dihydro-5,10-dimethylphenazine were dissolved into solution by stirring. To an additional 125 g of this stock solution, 16 g of Viasorb 910 and 5.7 g of 1,1'-di (phenylpropyl)4,4'-dipyridinium difluoroborate were dissolved into solution by stirring.

The electrochromic layer was prepared as follows: 20 g of each of the above solutions were mixed together along with 0.4 g of isophorone diisocyanate (Aldrich Chemical Co.) and three drops of dibutyl tin dilaurate (Aldrich Chemical Co.). 2 in.×10 in. electrochromic devices with a 0.0137 cm spacing between the electrode layers were filled with the above electrochromic layer material and the electochromic layer was galled by being held at 90° C. for one hour. The resulting electrochromic layer, comprising about 10% by weight of polymer matrix, was non-flowing, non-weeping, haze-free and remarkably stable during cycling for 73,000 cycles of 30 sec. on (1.2 V DC between electrode layers)/30 sec. off (short circuit between electrode layers) at 70° C. During these 73,000 cycles, the clear-state transmittance started at 78% and degraded to only 69%.

Electrochromic layer material made as described in the previous paragraph was also used to fill an electrochromic mirror element, in which the electrochromic device was the same as the one described in the previous paragraph (fluorine-doped tin oxide electrode layers, 22 ohm per square sheet resistance, 0.0137 cm spacing between electrode layers), and the polymer matrix was formed in the material by holding the element at 90° C. for an hour. After formation of the matrix, reflectance from the element was measured. The reflectance was 74% at zero-potential equilibrium. When 1.2 V DC was applied between the electrode layers and across the electrochromic layer, the reflectance decreased to 10% in 7.5 seconds and to 7% in 15 seconds. When the electrode layers were short-circuited, the reflectance increased from 7% to 74% in 30 seconds and from 10% to 60% in 11.5 seconds.

EXAMPLE 7

Large Area Electrochromic Device with an Electrochromic Layer with Substantially No Hydrostatic Flow A large area device that acted as a variable transmittance light filter or window was constructed to show the advantage of an electrochromic layer with substantially no hydrostatic flow. The device was constructed with two 42×44 inch sheets of fluorine doped tin-oxide coated glass with a sheet resistance of 22 ohms per square, separated by a primary seal made of 0.075 inch thick polyisobutylene with a rigid UV curable adhesive material to create a secondary seal to help maintain the shape of the primary seal.

The window was filled with a solution consisting of 1100 ml 0.01 M benzyl viologen difluoroborate (difluoroborate (($BF_4^-$)$_2$) salt of 1,1'-dibenzyl-4,4'-dipyridinium) in propylene carbonate, 1100 ml 0.01 M 5,10-dihydro-5,10-dimethylphenazine in propylene carbonate, 387.2 g Desmophen 1700, 52.8 g Desmodur N-100, and 1 ml dibutyltin diacetate (Aldrich Chemical Co.) using nitrogen pressure to force the fluid into the window through a ⅜ inch inlet tube connected to a fill hole at one corner of one of the walls. Air exited the window through a separate fill hole at the opposite corner of the same wall.

After 64 hours, a sample of the electrochromic layer materials that had been retained in a sealed vial had gelled. Careful examination of the electrochromic layer near the fill holes of the device indicated that the layer materials in the device had gelled as well. The fill holes were then sealed with a UV-cure adhesive.

The window was place in an upright position and contact clips were applied around the perimeter of both electrode layers and a potential difference of 1.2 V DC was applied between the transparent conductive electrodes. The window achieved a transmission of less than five percent after a period of 20 minutes. When the potential difference between the electrode layers was removed, the transmission returned to its original value of greater than seventy percent. The window showed remarkable coloring uniformity and no evidence of fluid flow toward the bottom.

The window was then darkened for 64 hours with a 1.2 V potential. The potential was then removed and the window cleared with no sign of segregation.

The window showed no problems due to the high force resulting from hydrostatic pressure.

EXAMPLE 8

Polymer Matrix from Polyester Polyol and Ketene 9,10-hydroanthracene-9,10-bisketene was prepared as described by Blomquist, J. Amer. Chem. Soc. 79, 2021 (1957).

The following solutions were made:

Solution A: 1.0 gm of 80 mM 5,10-dihydro-5,10-dimethylphenazine in propylene carbonate, 0.26 gm of the polyester polyol sold by Miles, Inc. as Desmophen R-18A (average molecular weight 2500 daltons, hydroxyl functionality of approximately 2.7, made from adipic acid, trimethyol propane, and diethylene glycol).

Solution B: 1.0 gm of 80 mM N,N'-di(3-phenyl(n-propyl)) bipyridinium difluoroborate in propylene carbonate, 0.26 gm of the polyester polyol sold by Miles, Inc. as Desmophen R-18A.

To solution A, 0.17 gm of bisketene crystals were stirred in until the solution began to gel, whereupon all of Solution B was added. The resulting solution was stirred well and set up to become a gel (free-standing, polymer matrix—electrochromic solution system).

Some of the resulting gel was placed between two tin oxide electrode layers on glass and 1.2 V of DC potential was applied across the gel. The gel layer colored and cleared quickly. No weeping was observed from the gel. Advantageously, in addition, no catalyst to initiate polymerization is required in this system.

EXAMPLE 9

Polymer Matrix from Polyacrylate Polyol with Hydroxyls Joined Using a Silicon Alkoxide A high molecular weight polyacrylate polyol solution was prepared as follows: 15 wt. % SR-495 with 0.04 wt. % V601 initiator in propylene carbonate were stirred at 120° C. for 3 hours with He being bubbled through the solution. To this solution, 5,10-dihydro-5,10-dimethylphenazine and N,N'-di(3-phenyl(n-propyl)) bipyridinium difluoroborate were added to make the solution 40 mM in both.

To 10 gm of the resulting solution, 1 drop (approx. 0.025 gm, of dibutyl tin dilaurate and 0.4 gms of tetramethyl orthosilicate ($Si(OCH_3)_4$) were added. This solution was used to fill an electrochromic device through a small hole near one end of one of the glass plates while air was allowed to escape through another small hole at the other end of the same glass plate. The holes were then plugged with polyamide hot-melt adhesive, and the device was then baked at 80° for approximately 1 hour, whereupon a polymer matrix formed. The device colored readily upon application of 1.2 V DC across the electrochromic layer, and cleared readily when short-circuited or open-circuited.

EXAMPLE 10

Electrochromic Layer with Polymer Matrix of Crosslinked Polyether Polyol 16.4 g of the polyether polyol Desmophen 1915U (sold by Miles, Inc., average molecular weight 4800 daltons, made with propylene and ethylene oxides starting on trifunctional material, hydroxyl functionality of 3), 1.90 g of Desmodur N-100, and 1 drop of dibutyl tin dilaurate (Aldrich) were mixed into a homogenous mixture. 4 g of this mixture was then combined with 8 g of 80 mM benzyl viologen difluoroborate in propylene carbonate and 8 g of 80 mM 5,10-dihydro-5,10-dimethylphenazine in propylene carbonate and the resulting mixture was stirred until a haze-free solution resulted.

The electrochromic device of an electrochromic mirror element like that described in Example 6 was vacuum filled with the resulting electrochromic layer precursor solution, the end-hole in the perimeter seal through which the device had been filled was plugged with a UV-cure adhesive, and the device was baked at 85° C. for 30 min. to form the polymer matrix.

When 1.2 V DC was applied between the electrode layers and across the electrochromic layer of the device, the reflectance from the mirror element decreased from the zero-potential equilibrium value of 71% to a low of 7%. When the electrode layers were short-circuited, the reflectance returned to 71%. The clearing back to 71% reflectance from 7% reflectance required about 3 seconds longer than such clearing in similar devices without the polymer matrix.

EXAMPLE 11

Electrochromic Layers with Various Solvents

The electrochromic layers described in this Example, involving a variety of solvents and solvent mixtures, were made and tested. The layers were found to provide electrochromically active layers that advantageously are non-weeping and non-cloudy.

A) To 0.48 grams Desmodur N-3300 and 3.52 grams Desmophen 1700, 6 grams of 32 mM of phenylpropyl viologen difluoroborate (1,1'-di(3-phenyl(n-propyl))4,4'-dipyridinium difluoroborate) and 32 mM DMP (5,10-dihydro-5,10-dimethylphenazine) in propylene carbonate and 1 drop (approximately 0.025 grams) of dibutyl tin dilaurate were added. From this mixture (40% by weight polymer matrix material and 60% by weight solvent containing electrochromic materials and catalyst) solution was taken and used to fill a 1 in.×2 in. transparent electrochromic device. Both the fluid in the device and that in the vial gelled in less than 4 hours at 80E C to form a non-weeping, non-cloudy free-standing electrochromic layer material. When 1.2 volts DC potential difference was applied across the electrochromic layer in the device, the device decreased in transmission. The device returned to the clear state when the potential difference was removed.

B) The experiment in part A of this example was repeated with a mixture of 30% by weight ethylene carbonate and 70% by weight propylene carbonate in place of propylene carbonate alone as solvent. As in part A, both the fluid in the device and that in the vial gelled in less than 4 hours at 80E C to form a non-weeping, non-cloudy electrochromic layer material. Also as in part A, when 1.2 volts DC potential difference was applied across the electrochromic layer in the device, the device decreased in transmission and then returned to the clear state when the potential difference was removed.

C) The experiment in part A of this example w a s repeated with a mixture of 30% by weight isobutylene carbonate and 70% by weight propylene carbonate in place of propylene carbonate alone as solvent. As in part A, both the fluid in the device and that in the vial gelled in less than 4 hours at 80E C to form a non-weeping, non-cloudy electrochromic layer material. Also as in part A, when 1.2 volts DC potential difference was applied across the electrochromic layer in the device, the device decreased in transmission and then returned to the clear state when the potential difference was removed.

D) The experiment in part A of this example was repeated with gamma butyrolactone alone in place of propylene carbonate alone as solvent. As in part A, both the fluid in the device and that in the vial gelled in less than 4 hours at 80E C to form a non-weeping, non-cloudy electrochromic layer material. Also as in part A, when 1.2 volts DC potential difference was applied across the electrochromic layer in the device, the device decreased in transmission and then returned to the clear state when the potential difference was removed.

E) To 0.48 grams Desmodur N-3300 and 3.52 grams Desmophen 1700, 6 grams of 16 mM phenylpropyl viologen difluoroborate and 16 mM EBTA (bis-3,3'-diethyl-2,2'-benzothiazole azine) in gamma valerolactone and 1 drop (approximately 0.025 grams) of dibutyl tin dilaurate were added. From this mixture (40% by weight polymer matrix materials and 60% by weight solvent containing electrochromic materials and catalyst) solution was taken and used to fill a 1 in.×2 in. transparent electrochromic device. Both the fluid in the device and that in the vial gelled in less than 4 hours at 80E C to form a non-weeping, non-cloudy, free-standing electrochromic material. When 1.2 volts DC potential difference was applied across the electrochromic layer in the device, the device decreased in transmission and then returned to the clear state when the potential difference was removed.

F) To 0.48 grams Desmodur N-3300 and 3.52 grams Desmophen 1700, 6 grams of 32 mM phenylpropyl viologen difluoroborate and 32 mM DMP in acetonitrile and 1 drop (approximately 0.025 grams) of dibutyl tin diacetate were added. From this mixture (40% by weight polymer matrix materials and 60% by weight solvent containing electrochromic materials and catalyst) solution was taken and used to fill a 1 in.×2 in. transparent electrochromic device. Both the fluid in the device and that in the vial gelled in less than 2 hours at 50E C to form a non-weeping, non-cloudy, free-standing electrochromic layer material. When 1.2 volts DC potential difference was applied across the electrochromic layer in the device, the device decreased in transmission and then returned to the clear state when the potential difference was removed.

G) To 0.48 grams Desmodur N-3300 and 3.52 grams Desmophen 1700, 6 grams of 32 mM phenylpropyl viologen difluoroborate and 32 mM DMP in propionitrile and 1 drop (approximately 0.025 grams) of dibutyl tin diacetate were added. From this mixture (40% by weight polymer matrix materials and 60% by weight solvent containing electrochromic materials and catalyst) solution was taken and used to fill a 1 in.×2 in. transparent electrochromic device. Both the fluid in the device and that in the vial gelled in less than 2 hours at 80E C to form a non-weeping, non-cloudy, free-standing electrochromic layer material. When 1.2 volts DC potential difference was applied across the electrochromic layer in the device, the device decreased in transmission and then returned to the clear state when the potential difference was removed.

H) To 0.48 grams Desmodur N-3300 and 3.52 grams Desmophen 1700, 6 grams of 32 mM phenylpropyl viologen difluoroborate and 32 mM DMP in glutaronitrile and 1 drop (approximately 0.025 grams) of dibutyl tin diacetate were added. From this mixture (40% by weight polymer matrix materials and 60% by weight solvent containing electrochromic materials and catalyst) solution was taken and used to fill a 1 in.×2 in. transparent electrochromic device. Both the fluid in the device and that in the vial gelled in less than 2 hours at 80E C to form a non-weeping, non-cloudy, free-standing electrochromic layer material. When 1.2 volts DC potential difference was applied across the electrochromic layer in the device, the device decreased in transmission and then returned to the clear state when the potential difference was removed.

I) To 0.48 grams Desmodur N-3300 and 3.52 grams Desmophen 1700, 6 grams of 32 mM phenylpropyl viologen difluoroborate and 32 mM DMP in dimethyl formamide and 1 drop (approximately 0.025 grams) of dibutyl tin diacetate were added. From this mixture (40% by weight polymer matrix materials and 60% by weight solvent containing electrochromic materials and catalyst) solution was taken and used to fill a 1 in.×2 in. transparent electrochromic device. Both the fluid in the device and that in the vial gelled in less than 2 hours at 80° C. to form a non-weeping, non-cloudy, free-standing electrochromic material. When 1.2 volts DC potential difference was applied across the electrochromic layer in the device, the device decreased in transmission and then returned to the clear state when the potential difference was removed.

J) To 0.48 grams Desmodur N-3300 and 3.52 grams Desmophen 1700, 6 grams of 32 mM phenylpropyl viologen difluoroborate and 32 mM DMP in dimethyl sulfoxide and 1 drop (approximately 0.025 grams) of dibutyl tin diacetate were added. From this mixture (40% by weight polymer matrix materials and 60% by weight solvent containing electrochromic materials and catalyst) solution was taken and used to fill a 1 in.×2 in. transparent electrochromic device. Both the fluid in the device and that in the vial gelled in less than 2 hours at 80° C. to form a non-weeping, non-cloudy, free-standing electrochromic layer material. When 1.2 volts DC potential difference was applied across the electrochromic layer in the device, the device decreased in transmission and then returned to the clear state when the potential difference was removed.

EXAMPLE 12

Effects of Polymer Matrix on Coloring and Clearing Speeds of Electrochromic Layers Tests were conducted of the effects of the amount of polymer matrix on the coloring and clearing speeds of electrochromic devices which comprise as the medium of variable transmittance an electrochromic layer comprising the matrix.

Electrochromic devices with the size and shape of automobile inside rearview mirror elements, approximately 2 in.×10 in. in cross-section and with fluorine-doped tin oxide electrodes spaced apart by a distance of 0.0125 cm were each filled with one of a variety of electrochromic-layer-precursor solutions made up from a blend of the matrix-forming materials, which consisted of 88% by weight Desmophen 1700, 12% by weight Desmodur N-100 and a trace (about 0.5%) of dibutyltin dilaurate, with various amounts of the electrochromic compounds, (benzyl viologen difluoroborate) and 5,10-dihydro-5,10-dimethylphenazine, dissolved in propylene carbonate. The solutions were made up so that the final concentration of each of the electrochromic compounds was 0.032 molar and the weight percentage of the blend that was matrix-forming materials varied as follows: 19%, 33%, 40%, 44% or 47%. After being filled with precursor solutions, the devices were plugged and then heated at 80EC, which caused the polymer matrices, and thereby the electrochromic layers, to form (gel) within the devices.

The devices with the electrochromic layers comprising polymer matrices were compared with a device which was filled with 0.032 molar of each of the electrochromic compounds in propylene carbonate without any matrix-forming materials.

The time was determined for the reflectance of each of the devices to change from the zero-potential equilibrium reflectance (high reflectance) to the lowest reflectance achieved (low reflectance) after 1.2 volts DC was applied between the electrodes and across the electrochromic layer (with polymer matrix) or solution (without polymer matrix). This time is referred to as the coloring time of the device. In Table I, the coloring times are listed with the percentages by weight of matrix-forming materials for the devices.

TABLE I

| Percentage by Weight of Matrix-forming Materials | Coloring Time (sec) |
| --- | --- |
| 0 | 12 |
| 19 | 12 |
| 33 | 15 |
| 40 | 18 |
| 44 | 20 |
| 47 | 24 |

In all cases, the high reflectance was about 73% and the low reflectance was about 7%. The polymer matrix had no significant effect on the high and low reflectances.

Surprisingly the coloring time or, alternatively, the "coloring speed" is substantially unaffected by the percentage of polymer matrix present in the electrochromic layer of the device up to at least about 45% by weight.

The time was also determined for the reflectance of each of the devices to change from the lowest reflectance achieved (low reflectance) with 1.2 volts DC applied between the electrodes and across the electochromic layer (with polymer matrix) or solution (without polymer matrix) to 75% of the zero-potential equilibrium reflectance (high reflectance) after the electrodes were short-circuited. In Table II, these "75% clearing times" are listed with the percentages by weight of matrix-forming materials for the devices.

TABLE II

| Percentage by Weight of Matrix-forming Materials | 75%-Clearing Time (sec) |
| --- | --- |
| 0 | 12 |
| 19 | 15 |
| 33 | 27 |
| 40 | 34 |
| 44 | 41 |
| 47 | 50 |

Clearing time or, alternatively, "clearing speed" is affected more than coloring time/coloring speed by the percentage of polymer matrix present in the electrochromic layer of a device. However, the clearing speed surprisingly is still acceptable for practical use of the tested devices in many applications even at polymer-matrix percentages up to about 30 wt% and would be acceptable for use of the devices in some applications at even higher polymer-matrix percentages.

EXAMPLE 13

Pre-polymer Solutions of Various Copolymers Pre-polymers were prepared as follows.

A) Propylene carbonate was added to a reaction flask and deoxygenated with dry nitrogen. 20 weight percent of monomers were added to the reaction flask in the molar ratio of 1 part 2-hydroxyethyl methacrylate (HEMA) to 10 parts methyl methacrylate (MMA). The MMA was purified by distillation at atmospheric pressure using a short path distillation apparatus. The HEMA was purified by distillation at a pressure of approximately 3 mm-Hg using a short path distillation apparatus. The reaction flask was heated and maintained at 70 degrees Celsius and a free radical initiator: V-601,(Dimethyl 2,2'-azobisisobutyrate), available from Wako Pure Chemical Industries, Ltd. (Osaka, Japan) was added. When the viscosity of the resulting solution increased noticeably, more propylene carbonate (at 70 degrees Celsius) was added to the flask. The reaction was continued under dry nitrogen until completion with the resulting weight percent of the pre-polymer being 10 percent.

B) Propylene carbonate was added to a reaction flask and deoxygenated with dry nitrogen. 20 weight percent of monomers were added to the reaction flask in the molar ratio of 1 part 2-hydroxyethyl methacrylate (HEMA) to 5 parts methyl methacrylate (MMA). The MMA was purified by distillation at atmospheric pressure using a short path distillation apparatus. The HEMA was purified by distillation at a pressure of approximately 3 mm-Hg using a short path distillation apparatus. The reaction flask was heated and maintained at 70 degrees Celsius and a free radical initiator: V-601, (Dimethyl 2,2'-azobisisobutyrate) was added. When the viscosity of the resulting solution increased noticeably, more propylene carbonate (at 70 degrees Celsius) was added to the flask. The reaction was continued under dry nitrogen until completion with the resulting weight percent of the pre-polymer being 10 percent.

C) Propylene carbonate was added to a reaction flask and deoxygenated with dry nitrogen. 20 weight percent of monomers were added to the reaction flask in the molar ratio of 1 part 2-isocyanatoethylmethacrylate (IEMA) to 20 parts methyl methacrylate (MMA). The MMA was purified by distillation at atmospheric pressure using a short path distillation apparatus. The IEMA was purified by distillation at a pressure of approximately 3 mm-Hg using a short path distillation apparatus. The reaction flask was heated and maintained at 70 degrees Celsius and a free radical initiator: V-601, (Dimethyl 2,2'-azobisisobutyrate) was added. When the viscosity of the resulting solution increased noticeably, more propylene carbonate (at 70 degrees Celsius) was added to the flask. The reaction was continued under dry nitrogen until completion with the resulting weight percent of the pre-polymer being 10 percent.

D) Propylene carbonate was added to a reaction flask and deoxygenated with dry nitrogen. 20 weight percent of monomers were added to the reaction flask in the molar ratio of 1 part glycidyl methacrylate (GMA) to 10 parts methyl methacrylate (MMA). The MMA was purified by distillation at atmospheric pressure using a short path distillation apparatus, and the GMA was purified by distillation at a pressure of approximately 3 mm-Hg using a short path distillation apparatus. The reaction flask was heated and maintained at 70 degrees Celsius and a free radical initiator: V-601, (Dimethyl 2,2'-azobisisobutyrate) was added. When the viscosity of the resulting solution increased noticeably, more propylene carbonate (at 70 degrees Celsius) was added to the flask. The reaction was continued under dry nitrogen until completion with the resulting weight percent of the pre-polymer being 10 percent.

E) Propylene carbonate was added to a reaction flask and deoxygenated with dry nitrogen. 20 weight percent of monomers were added to the reaction flask in the molar ratio of 1 part vinyl ether n-butyl methyl methacrylate (VEnBMA) to 10 parts methyl methacrylate (MMA). The MMA was purified by distillation at atmospheric pressure using a short path distillation apparatus. The VEnBMA was purified by distillation at a pressure of approximately 3 mm-Hg using a short path distillation apparatus. The reaction flask was heated and maintained at 70 degrees Celsius and a free radical initiator: V-601 (Dimethyl 2,2'-azobisisobutyrate), available from Wako Pure Chemical Industries, Ltd. (Osaka, Japan) was added. When the viscosity of the resulting solution increased noticeably, more propylene carbonate (at 70 degrees Celsius) was added to the flask. The reaction was continued under dry nitrogen until completion with the resulting weight percent of the pre-polymer being 10 percent.

F) Propylene carbonate was added to a reaction flask and deoxygenated with dry nitrogen. 20 weight percent of monomers were added to the reaction flask in the molar ratio of 1 part 2-(acetoacetoxy)ethyl methacrylate (AAEMA) to 10 parts methyl methacrylate (MMA). The MMA was purified by distillation at atmospheric pressure using a short path distillation apparatus. The HEMA was purified by distillation at a pressure of approximately 3 mm-Hg using a short path distillation apparatus. The reaction flask was heated and maintained at 70 degrees Celsius and a free radical initiator: V-601, (Dimethyl 2,2'-azobisisobutyrate), available from Wako Pure Chemical Industries, Ltd. (Osaka, Japan) was added. When the viscosity of the resulting solution increased noticeably, more propylene carbonate (at 70 degrees Celsius) was added to the flask. The reaction was continued under dry nitrogen until completion with the resulting weight percent of the pre-polymer being 10 percent.

EXAMPLE 14

Electrochromic Layer with Polymer Matrix of Crosslinked HEMA/MMA Copolymer

The pre-polymer solution of Example 13 A was diluted to 7% by weight polymer with propylene carbonate. The pre-polymer solution was made 30 millimolar in Tinuvin p, 17 millimolar in 1,1'-d-(3-phenyl(n-propyl)-4,4' bipyridinium and 14 millimolar in 5,10-dihydro-5,10-dimethlphenazine simply by dissolving appropriate amounts of these materials in the pre-polymer solution. This solution was degassed by vacuum and flushed with nitrogen. Sufficient tolylene 2,4-diisocyanate (available from Aldrich Chemical Company, Inc. Milwaukee, Wis.) crosslinker was added to crosslink approximately 50 percent of the theoretical hydroxyl position. This solution was thoroughly mixed to ensure that the crosslinker was evenly distributed throughout the fluid.

Electrochromic window devices were fabricated as is known in the art with TEC-20 glass from Libbey-Owen-Ford with a 250 micrometer cell spacing. These window devices had the dimensions of about 2.5 inches by 5 inches. The above electrochromic solution was introduced into the devices via the vacuum backfilling technique. The vacuum fill port of the devices were plugged with a UV cure material.

The electrochromic polymer solution had reached its gel point within 0.5 hours of adding the crosslinking agent. Crosslinking could either be continued at room temperature or it could be optionally accelerated by placing the part in a warm oven, e.g., 70 degree Celsius.

After crosslinking the electrochromic polymer solution formed a free-standing, non-weeping gel and its function was tested by applying 1.2 volts. Transmission of these parts in the bleached state was close to 80%. In the fully darkened state the transmission was close to 8%. The transmission went from 80 to 8 in about 30 seconds and from 8% to 80% in about 45 seconds at short circuit. Some streaking and spotting in the glass was visible especially in the transitions between bleached and fully dark. The streaking and spotting became more apparent after xenon arc lamp exposure.

EXAMPLE 15

Electrochromic Layer with Polymer Matrix of Crosslinked HEMA/MMA Copolymer

The pre-polymer solution of Example 13A was diluted to 7% by weight polymer with propylene carbonate. The pre-polymer solution was made 30 millimolar in Tinuvin p, 34 millimolar in 1,1'-di(3-phenyl(n-propyl)-4,4' bipyridinium and 28 millimolar in 5,10-dihydro-5,10-dimethylphenazine simply by dissolving appropriate amounts of these materials in the pre-polymer solution. This solution was degassed by vacuum and flushed with nitrogen. Sufficient tolylene 2,4-diisocyanate (available from Aldrich Chemical Company, Inc. Milwaukee, Wis.) crosslinker was added to crosslink approximately 50 percent of the theoretical hydroxyl position. We thoroughly mixed this solution to ensure that the crosslinker was evenly distributed throughout the fluid.

Electrochromic window devices were fabricated as is known in the art with TEC-20 glass from Libbey-Owen-Ford with a 137 micrometer cell spacing. These window devices had the dimensions of about 2.5 inches by 5 inches. The above electrochromic solution was introduced into the devices via the vacuum backfilling technique. The vacuum fill port of the devices were plugged with a UV cure material.

The electrochromic solution had reached its gel point within 0.5 hours of adding the crosslinking agent. Crosslinking could either be continued at room temperature or it could be optionally accelerated by placing the part in a warm oven, e.g., 70 degree Celsius.

After crosslinking the electrochromic polymer solution formed a free-standing, non-weeping gel and its function was tested by applying 1.2 volts. Transmission of these parts in the bleached state was close to 80%. In the fully darkened state the transmission was close to 8%. The transmission went from 80 to 8 in about 10 seconds and from 8% to 80% in about 15 seconds at short circuit. Some streaking and spotting in the glass was visible especially in the transitions between bleached and fully dark.

EXAMPLE 16

Electrochromic Layer with Polymer Matrix of Crosslinked HEMA/MMA Copolymer

The pre-polymer solution of Example 13B was diluted to 5% by weight polymer with propylene carbonate. The pre-polymer solution was made 30 millimolar in Tinuvin p, 3 millimolar in 1,1'-di(3-phenyl(n-propyl)-4,4' bipyridinium and 3 millimolar in 5,10-dihydro-5,10-dimethylphenazine simply by dissolving appropriate amounts of these materials in the pre-polymer solution. This solution was degassed by vacuum and flushed with nitrogen. Sufficient tolylene 2,4-diisocyanate (available from Aldrich Chemical Company, Inc. Milwaukee, Wis.) crosslinker was added to crosslink approximately 60 percent of the theoretical hydroxyl position. We thoroughly mixed this solution to ensure that the crosslinker was evenly distributed throughout the fluid.

A part was assembled which was large enough to allow observation of its performance over long periods of time in a use similar to that proposed for an electrochromic window. The part was an assembly of glass substrates assembled in accordance with the teachings of co-filed U.S. Pat. No. Application entitled "Electro-Optic Window Incorporating a Discrete Photovoltaic Device", filed on or about Mar. 15, 1996. This assembly had the dimensions of about 100 cm by 140 cm, and had an interpane space of about 1.5 millimeters. The above electrochromic solution was introduced into the device.

The electrochromic polymer solution had reached its gel point within 3 days of adding the crosslinking agent. Crosslinking could either be continued at room temperature or it could be optionally accelerated by placing the part in a warm oven, e.g., 70 degree Celsius.

After crosslinking the electrochromic polymer solution formed a free-standing, non-weeping gel and its function was tested by applying 1.0 volts. Transmission of these parts in the bleached state was 78%. In the fully darkened state the transmission was 5%. The transmission went from 78% to 5% in about 20 minutes and colors from the edges to the center. The window showed no effects of hydrostatic pressure problems even after standing in a vertical orientation for several months. Brush marks and streaks are apparent especially at transition levels in transmission. The marks and streaks became more apparent during use over a period of several months.

EXAMPLE 17

Electrochromic Layer with Copolymer Matrix HEMA/MMA Crosslinked with IEMA/MMA

The pre-polymer solution of Example 13A was diluted to 7% by weight polymer with propylene carbonate and was made 30 millimolar in Tinuvin p and 34 millimolar in 1,1'-di(3-phenyl(n-propyl)-4,4' bipyridinium simply by dissolving appropriate amounts of these materials in the pre-polymer solution. The pre-polymer solution of Example 13C was diluted to 7% by weight polymer with propylene carbonate and was made 30 millimolar in Tinuvin p and 28 millimolar in 5,10-dihydro-5,10-dimethylphenazine simply by dissolving appropriate amounts of these materials in the pre-polymer solution. These solutions were combined, thoroughly mixed and degassed by vacuum and flushed with nitrogen.

Electrochromic window devices were fabricated as is known in the art with TEC-20 glass from Libbey-Owen-Ford with a 250 micrometer cell spacing. These window devices had the dimensions of about 2.5 inches by 5 inches. The above electrochromic solution was introduced into the devices via the vacuum backfilling technique. The vacuum fill port of the devices were plugged with a UV cure material.

The electrochromic solution had reached its gel point within 3 days of adding the crosslinking agent. Crosslinking could either be continued at room temperature or it could be optionally accelerated by placing the part in a warm oven, e.g., 70 degree Celsius.

After crosslinking the electrochromic polymer solution formed a free standing, non-weeping gel and its function was tested by applying 1.2 volts. Transmission of these parts in the bleached state was close to 80%. In the fully darkened state the transmission was close to 8%. The transmission went from 80 to 8 in about 30 seconds and from 8% to 80% in about 45 seconds at short circuit. No streaking or spotting glass was observed, even during the transitions between bleached and fully dark.

EXAMPLE 18

Electrochromic Layer with Copolymer Matrix HEMA/MMA Crosslinked with IEMA/MMA

The pre-polymer solution of Example 13A was diluted to 7% by weight polymer with propylene carbonate and was made 30 millimolar in Tinuvin p and 68 millimolar in 1,1'-di (3-phenyl(n-propyl)-4,4' bipyridinium simply by dissolving appropriate amounts of these materials in the pre-polymer solution. The pre-polymer solution of Example 13C was diluted to 7% by weight polymer with propylene carbonate and was made 30 millimolar in Tinuvin p and 56 millimolar in 5,10-dihydro-5,10-dimethylphemazine simply by dissolving appropriate amounts of these materials in the pre-polymer solution. These solutions were combined, thoroughly mixed and degassed by vacuum and flushed with nitrogen.

The mirror devices were assemblies of one glass substrate coated with chromium which was over-coated with a thin layer of rhodium and another glass substrate coated with tin oxide (TEC-20 glass) and were fabricated as is known in the art with a 137 micrometer cell spacing. These mirror devices had the dimensions of about 2.5 inches by 5 inches. The above electrochromic solution was introduced into the devices via the vacuum backfilling technique. The vacuum fill port of the devices were plugged with a UV cure material.

The electrochromic solution had reached its gel point within 3 days of adding the crosslinking agent. Crosslinking could either be continued at room temperature or it could be optionally accelerated by placing the part in a warm oven, e.g., 70 degree Celsius.

After crosslinking the electrochromic polymer solution formed a free standing, non-weeping gel and its function was tested by applying 1.2 volts. Reflectance of these parts in the bleached state was close to 55%. In the fully darkened state the reflectance was close to 7%. The reflectance went from 55% to 7% in about 10 seconds and from 7% to 55% in about 15 seconds. No streaking or spotting in the electrochromic mirror area was visible even after exposure to xenon arc lamp illumination.

EXAMPLE 19

Electrochromic Layer with Polymer Matrix of Crosslinked IEMA/MMA Copolymer

The pre-polymer solution of Example 13C was diluted to 7% by weight polymer with propylene carbonate. The pre-polymer solution was made 30 millimolar in Tinuvin p, 34 millimolar in 1,1'-di(3-phenyl(n-propyl)-4,4' bipyridinium and 28 millimolar in 5,10-dihydro-5,10-dimethylphenazine simply by dissolving appropriate amounts of these materials in the pre-polymer solution. This solution was degassed by vacuum and flushed with nitrogen. A sufficient amount of previously recrystallized resorcinol crosslinker was added to crosslink approximately 100 percent of the isocyanate sites. We thoroughly mixed this solution to ensure that the crosslinker was evenly distributed throughout the fluid.

An electrochromic mirror device was prepared as in example 18, except that it was filled with the above electrochromic solution.

The electrochromic solution had reached its gel point within 0.5 hours of adding the crosslinking agent. Crosslinking could either be continued at room temperature or it could be optionally accelerated by placing the part in a warm oven, e.g., 70 degree Celsius.

After crosslinking the electrochromic polymer solution formed a free standing, non-weeping gel and its function was tested by applying 1.2 volts. Reflectance of these parts in the bleached state was close to 55%. In the fully darkened state the reflectance was close to 8%. The reflectance went from 55% to 8% in about 10 seconds and from 8% to 55% in about 15 seconds at short circuit. These parts showed no signs of streaking, spotting or unevenness of coloration even after exposure to xenon arc lamp illumination.

EXAMPLE 20

Electrochromic Layer with Polymer Matrix of Crosslinked GMA/MMA Copolymer

The pre-polymer solution of Example 13D was diluted to 7% by weight polymer with propylene carbonate. The pre-polymer solution was made 30 millimolar in Tinuvin p, 17 millimolar in 1,1'-di(3-phenyl(n-propyl)-4,4' bipyridinium and 14 millimolar in 5,10-dihydro-5,10-dimethylphenazine simply by dissolving appropriate amounts of these materials in the pre-polymer solution. This solution was degassed by vacuum and flushed with nitrogen.

Electrochromic window devices were fabricated as is known in the art with TEC-20 glass from Libbey-Owen-Ford with a 250 micrometer cell spacing. These window devices had the dimensions of about 2.5 inches by 5 inches. The above electrochromic solution was introduced into the devices via the vacuum backfilling technique. The vacuum fill port of the devices were plugged with a UV cure material.

The electrochromic solution had reached its gel point within 0.5 hours of adding the of 1,1'-di(3-phenyl(n-propyl)-4,4' bipyridinium. Crosslinking could either be continued at room temperature or it could be optionally accelerated by placing the part in a warm oven, e.g., 70 degree Celsius.

After crosslinking the electrochromic polymer solution formed a free standing, non-weeping gel and its function was tested by applying 1.2 volts. Transmission of these parts in the bleached state was close to 80%. In the fully darkened state the transmission was close to 8%. The transmission went from 80% to 8% in about 30 seconds and from 8 to 80 in about 45 seconds. No streaking of spotting in the glass was visible even after exposure to xenon arc lamp illumination.

EXAMPLE 21

Electrochromic Layer with Copolymer Matrix AAEMA/MMA Crosslinked with IEMA/MMA

The pre-polymer solution of Example 13F was diluted. to 7% by weight polymer with propylene carbonate and was made 30 millimolar in Tinuvin p and 34 millimolar in 1,1'-di(3-phenyl(n-propyl)-4,4' bipyridinium simply by dissolving appropriate amounts of these materials in the pre-polymer solution. The pre-polymer solution of Example 13C was diluted to 7% by weight polymer with propylene carbonate and was made 30 millimolar in Tinuvin p and 28 millimolar in 5,10-dihydro-5,10-dimethylphenazine simply by dissolving appropriate amounts or these materials in the pre-polymer solution. These solutions were combined, thoroughly mixed and degassed by vacuum and flushed with nitrogen.

EXAMPLE 22

Electrochromic Layer with Polymer Matrix of Crosslinked AAEMA/MMA Copolymer

The pre-polymer solution of Example 13F was diluted to 7% by weight polymer with propylene carbonate. The pre-polymer solution was made 30 millimolar in Tinuvin p, 17 millimolar in 1,1'-di(3-phenyl(n-propyl)-4,4' bipyridinium and 14 millimolar in 5,10-dihydro-5,10-dimethylphenazine simply by dissolving appropriate amounts of these materials in the pre-polymer solution. This solution was degassed by vacuum and flushed with nitrogen. This solution may be used with diisocyanate or polyisocyanate solutions to provide gelled electrochromic layers.

EXAMPLE 23

Electrochromic Layer with Polymer Matrix of Crosslinked Vinyl Ether

To a solution of 2.5 grams tetraethylene glycol divinyl ether and 7.5 grams propylene carbonate, 0.75 grams of 1,1'-di(benzyl)-4,4' bipyridinium difluoroborate and 0.25 grams of 5,10-dihydro-5,10-dimethylphenazine were added and allowed to dissolve. A portion of this solution was used to fill a 1 inch by 2 inch part via injection with a pipette. The part was an assembly of a glass substrate coated with tin oxide onto which a bead of seal material was dispensed containing 137 micrometer spacers. A second tin oxide coated glass substrate was placed over the first and the seal material was cured. The electrochromic solution reached its gel point in approximately 3 hours while in a 85 degree Celsius oven. After gellation, the function of the unit was tested by applying 1.2 volts. There was a substantial decrease in transmission and upon removal of the voltage the unit returned to its bleached state. The overall color of the unit had a slightly amber hue.

While the invention has been described in detail herein in accordance with certain preferred embodiments thereof, many modifications and changes therein may be effected by those skilled in the art. Accordingly, it is our intent to be limited only by the scope of the appending claims and not by way of the details and instrumentalities describing the embodiments shown herein.

We claim:

1. A variable transmittance electrochromic window comprising:

first and second transparent substrates each having outer surfaces and opposed inner surfaces;

first and second transparent electrodes disposed on the inner surface of at least one of said first and second transparent substrates;

a seal disposed between said first and second transparent substrates to define a sealed chamber therebetween; and an electrochromic layer of reversibly variable transmittance to light disposed in said chamber, said electrochromic layer comprising a solvent, at least one solution based electrochromic material in solution in said solvent, and a cross-linked polymer matrix that results from cross-linking polymer chains, where said polymer chains are formed prior to cross-linking, and said electrochromic material is interspersed in said polymer matrix.

2. A variable transmittance electrochromic window comprising:

first and second transparent substrates each having outer surfaces and opposed inner surfaces;

first and second transparent electrodes disposed on the inner surface of at least one of said first and second transparent substrates;

a seal disposed between said first and second transparent substrates to define a sealed chamber therebetween; and an electrochromic layer of reversibly variable transmittance to light disposed in said chamber, said electrochromic layer comprising:

(a) a solvent (b) a cross-linked polymer matrix; and (c) at least one electrochromic compound in solution in said solvent and interspersed in said polymer matrix; where said polymer matrix results from cross-linking polymer chains and where said polymer chains are formed prior to cross-linking by polymerizing at least one monomer selected from the group of compounds represented by the formula:

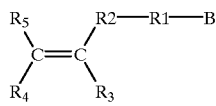

where R1 is selected from the group consisting of: alkyl, cycloalkyl, poly-cycloalkyl, heterocycloalkyl, carboxyl and alkyl and alkenyl derivatives thereof; alkenyl, cycloalkenyl, cycloalkadienyl, poly-cycloalkadienyl, aryl and alkyl and alkenyl derivatives thereof, hydroxyalkyl; hydroxyalkenyl; alkoxyalkyl; and alkoxyalkenyl where each of the compounds has from 1 to 20 carbon atoms;

where R2 is selected from the group consisting of alkyl, cycloalkyl, alkoxyalkyl, carboxyl, phenyl and keto where each of the compounds has from 1–8 carbon atoms, and oxygen;

where R3, R4, and R5 may be the same or different and may be selected from the group consisting of: hydrogen, alkyl, cycloalkyl, poly-cycloalkyl, heterocycloalkyl, and alkyl and alkenyl derivatives thereof; alkenyl, cycloalkenyl, cycloalkadienyl, poly-cycloalkadienyl, aryl and alkyl and alkenyl derivatives thereof; hydroxyalkyl; hydroxyalkenyl; alkoxyalkyl; alkoxyalkenyl; keto; acetoacetyl; vinyl ether and combinations thereof, where each of the compounds has from 1 to 8 carbon atoms; and where B may be selected from the group consisting of hydroxyl; cyanato; isocyanato; isothiocyanato; epoxide; silanes; ketenes; acetoacetyl; keto; carboxylate; imino; amine; aldehyde; metal alkoxide; thiol and vinyl ether.

3. The electrochromic window according to claim 2, where said at least one monomer is selected from the group consisting of: methyl methacrylate; methyl acrylate; 2-isocyanatoethyl methacrylate; 2-isocyanatoethyl acrylate; 2-hydroxyethyl methacrylate; 2-hydroxyethyl acrylate; 3-hydroxypropyl methacrylate; vinyl ether n-butyl methyl methacrylate; tetraethylene glycol vinyl ether; glycidyl methacrylate; 4-vinylphenol; acetoacetoxyethyl methacrylate; and acetoacetoxyethyl acrylate.

4. The electrochromic window according to claim 3, where said at least one monomer is selected from the group consisting of: methyl methacrylate; 2-isocyanatoethyl methacrylate; 2-hydroxyethyl methacrylate; and glycidyl methacrylate.

5. The electrochromic window according to claim 3, where said at least one monomer is purified prior to forming said polymer chains.

6. The electrochromic window according to claim 3, where said at least one monomer is purified by a technique selected from the group consisting of chromatography and distillation.

7. The electrochromic window according to claim 6, where said at least one monomer is purified by chromatography.

8. The electrochromic window according to claim 6, where said at least one monomer is purified by distillation.

9. The electrochromic window according to claim 2, where said at least one monomer is polymerized to form said polymer chains prior to insertion into said electrochromic window and where said polymer chains are cross-linked within said window to form said polymer matrix.

10. The electrochromic window according to claim 2, where, prior to cross-linking, said polymer chains are substantially linear.

11. The electrochromic window according to claim 10, where said monomer polymerization takes place in the presence of an azo thermal initiator.

12. The electrochromic window according to claim 2, where said polymer chains are cross-linked by reaction with a compound having a functional group selected from the group consisting of aromatic and aliphatic hydroxyl; aromatic and aliphatic cyanato; aliphatic and aromatic isothiocyanato, with a functionality of at least 2.

13. The electrochromic window according to claim 12, where said at least one electrochromic compound comprises a cathodic electrochromic compound, which is a salt of a dication selected from the group consisting of N, N'-substituted 4,4'-dipyridyls with hydrogen at all of the 2, 2', 6, and 6' positions and with the N and N' substituents being the same or different and each being selected from the group consisting of alkyl groups of 1–10 carbons, phenyl, benzyl, 2-phenylethyl, 3-phenyl(n-propyl), and 4-phenyl(n-butyl) and N,N'-substituted dipyridyls with an alkyl group of 1–4 carbons at each of the 2, 2', 6, and 6' positions and with the N and N' substituents being the same or different and each being selected from the group consisting of alkyl groups of 1–10 carbons, benzyl, 2-phenylethyl, 3-phenyl(n-propyl), and 4-phenyl(n-butyl).

14. The electrochromic window according to claim 13, where said at least one electrochromic compound further comprises an anodic electrochromic compound, which is selected from the group consisting of 5,10-dihydro-5,10-dimethylphenazine, N,N,N',N'-tetramethyl-p-phenylenediamine, N,N,N',N'-tetraphenyl-p-phenylenediamine, bis-3,3'-diethyl-2,2'-benzothiazoleazine, and tetrathiafulvalene.

15. The electrochromic window according to claim 13, where said at least one electrochromic compound further comprises an anodic electrochromic compound, which is 5,10-dihydro-5,10-dimethylphenazine.

16. The electrochromic window according to claim 15, where said cathodic electrochromic compound is a salt of 1,1'-di(3-phenyl(n-propyl))-4,4'-dipyridinium.

17. The electrochromic window according to claim 15, where the salt is a fluoroborate.

18. The electrochromic window according to claim 15, where said solvent is propylene carbonate.

19. The electrochromic window according to claim 2, where said polymer chains are cross-linked by reaction with a compound having a functional group selected from the group consisting of: isocyanate, alcohol, ketene, epoxide, silane, alkoxide, hydroxyl, thiol, acetoacetyl, urea, melamine, urethane, carboxylate, imino, amine, aldehyde, and vinyl ether.

20. The electrochromic window according to claim 2, where said at least one monomer is polymerized in said solvent to form said polymer chains.

* * * * *